United States Patent [19]
Martin

[11] Patent Number: 5,975,831
[45] Date of Patent: Nov. 2, 1999

[54] ATV-MOUNTED GAME HOIST

[76] Inventor: John W. Martin, 410 Ashley 271 R.D., Hamburg, Ark. 71646-8922

[21] Appl. No.: 09/235,357

[22] Filed: Jan. 21, 1999

[51] Int. Cl.[6] .................................................. B60P 1/54
[52] U.S. Cl. ........................ 414/543; 414/540; 414/547; 414/462; 212/180
[58] Field of Search .................................. 414/462, 540, 414/541, 542, 543, 546, 547, 550, 555, 560, 569; 212/180, 901

[56] References Cited

U.S. PATENT DOCUMENTS

| | | |
|---|---|---|
| 2,496,401 | 2/1950 | McKinney . |
| 2,509,950 | 5/1950 | Zierke ...................................... 414/543 |
| 3,854,594 | 12/1974 | Brookes .............................. 414/543 X |
| 3,952,893 | 4/1976 | Kolesar ............................... 414/543 X |
| 4,069,922 | 1/1978 | Hawkins ............................. 414/543 X |
| 4,614,252 | 9/1986 | Tarner ..................................... 182/116 |
| 4,640,658 | 2/1987 | Webb, Jr. . |
| 4,799,711 | 1/1989 | Moore ..................................... 280/444 |
| 4,806,063 | 2/1989 | York . |
| 4,961,604 | 10/1990 | Kisner . |
| 4,979,865 | 12/1990 | Strickland ........................... 414/540 X |
| 5,040,937 | 8/1991 | Godbersen . |
| 5,236,062 | 8/1993 | Laney ..................................... 182/127 |
| 5,393,194 | 2/1995 | Smith ...................................... 414/546 |
| 5,419,672 | 5/1995 | Poe . |
| 5,431,526 | 7/1995 | Peterson et al. ..................... 414/540 X |
| 5,445,487 | 8/1995 | Koscinski ................................ 414/543 |
| 5,531,478 | 7/1996 | Houston et al. ........................ 280/762 |
| 5,662,451 | 9/1997 | Muzzi et al. . |
| 5,706,990 | 1/1998 | Lahrson ................................. 224/410 |
| 5,752,799 | 5/1998 | Carey et al. ............................ 414/543 |
| 5,765,917 | 6/1998 | Johnson ................................. 297/352 |
| 5,788,095 | 8/1998 | Watson ................................ 414/543 X |
| 5,876,005 | 3/1999 | Vasconi ................................. 248/276.1 |
| 5,878,929 | 3/1999 | Leonard ................................. 224/401 |

OTHER PUBLICATIONS

Advertisement, ATV Deer Kaddy, *Sportsman's Bucksaver Magazine*, Sep./Oct. 1998, p. 23, vol. 6, No. 5, Monroe, LA.
"Deer Kaddy to the Rescue," *Sportsman's Bucksaver Magazine*, Sep./Oct. 1998, pp. 26–27, vol. 6, No. 5, Monroe, LA.
Advertisement, CDS, Inc., *Sportsman's Bucksaver Magazine*, Sep./Oct. 1998, p. 43, vol. 6, No. 5, Monroe, LA.
Advertising Brochure, Original Deerlift, D.P.M. Enterprises, Inc., date unknown, 2 pgs.
Screens printed from Internet site, www.submitmaster.net/store/deerlift, 12 pgs.

*Primary Examiner*—Thomas J. Brahan
*Assistant Examiner*—Gerald J. O'Connor
*Attorney, Agent, or Firm*—Ray F. Cox, Jr.

[57] ABSTRACT

A game hoist for mounting to the cargo rack of an all-terrain vehicle (ATV). The game hoist is mounted to the cargo rack using a base plate which has one or more sets of angle brackets mounted to the underside of the base plate. The sets of angle brackets form pockets or receptacles to slidably receive respective rods of the cargo rack. The base plate has an upward facing cylindrical post which receives a cylindrical column. A telescoping boom is provided with a cylindrical collar which fits over the top end of the column. The telescoping boom has an inner cylindrical member which is slidingly received in an outer cylindrical member. The inner cylindrical member may be telescoped outward from the outer cylindrical member. The outer end of the inner cylindrical member is provided with a manually operated winch. The winch is desirably provided with a ratchet mechanism.

9 Claims, 5 Drawing Sheets

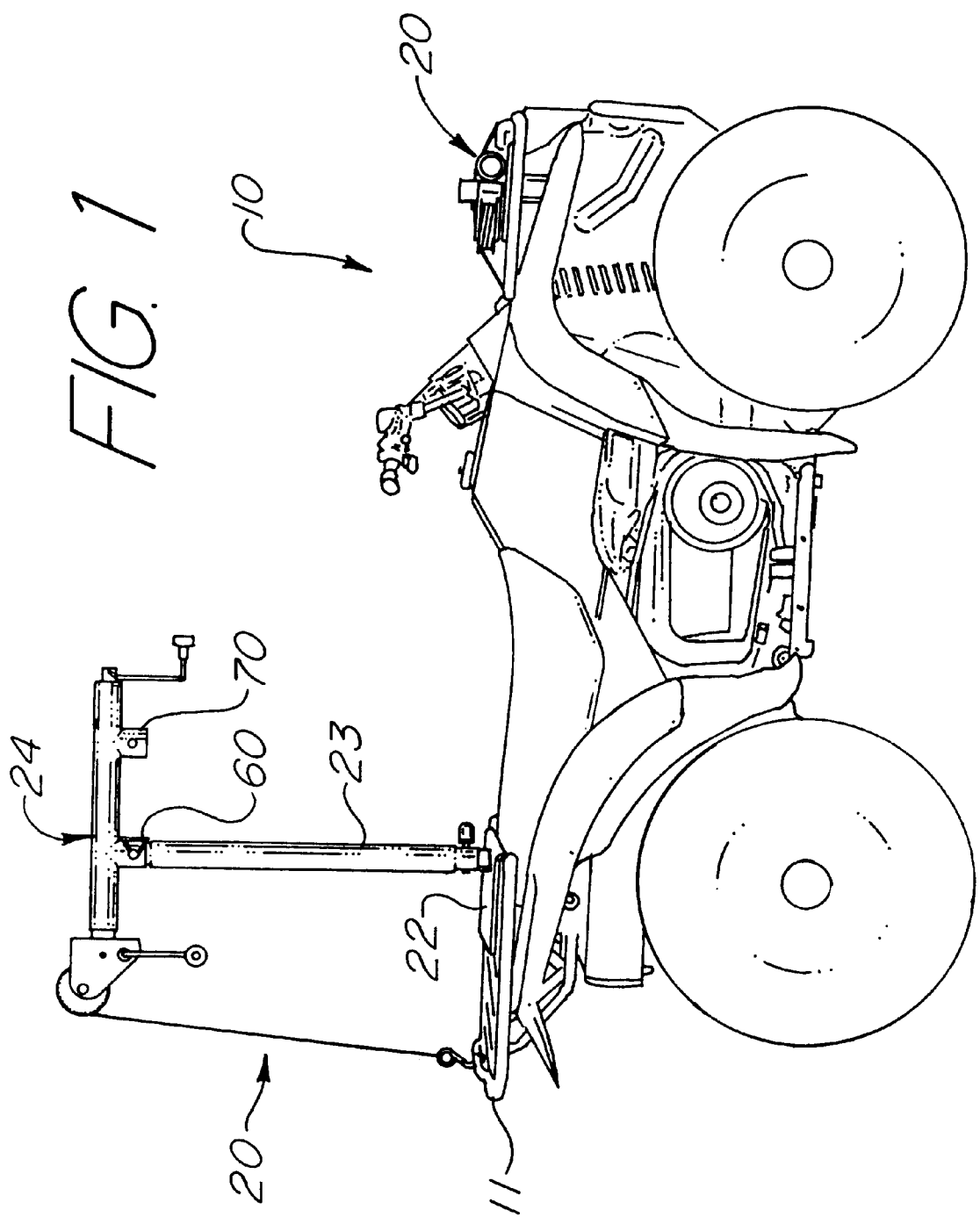

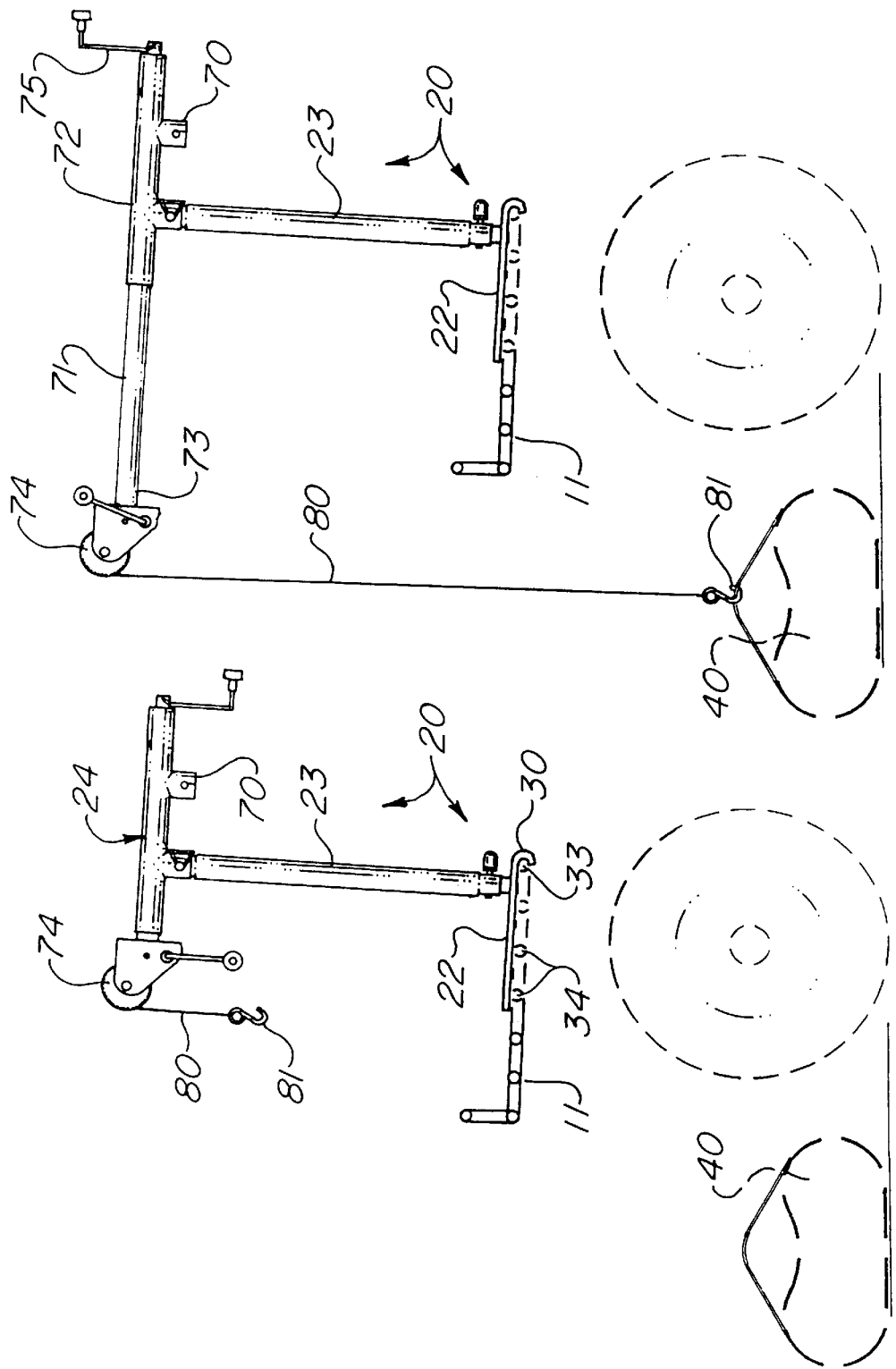

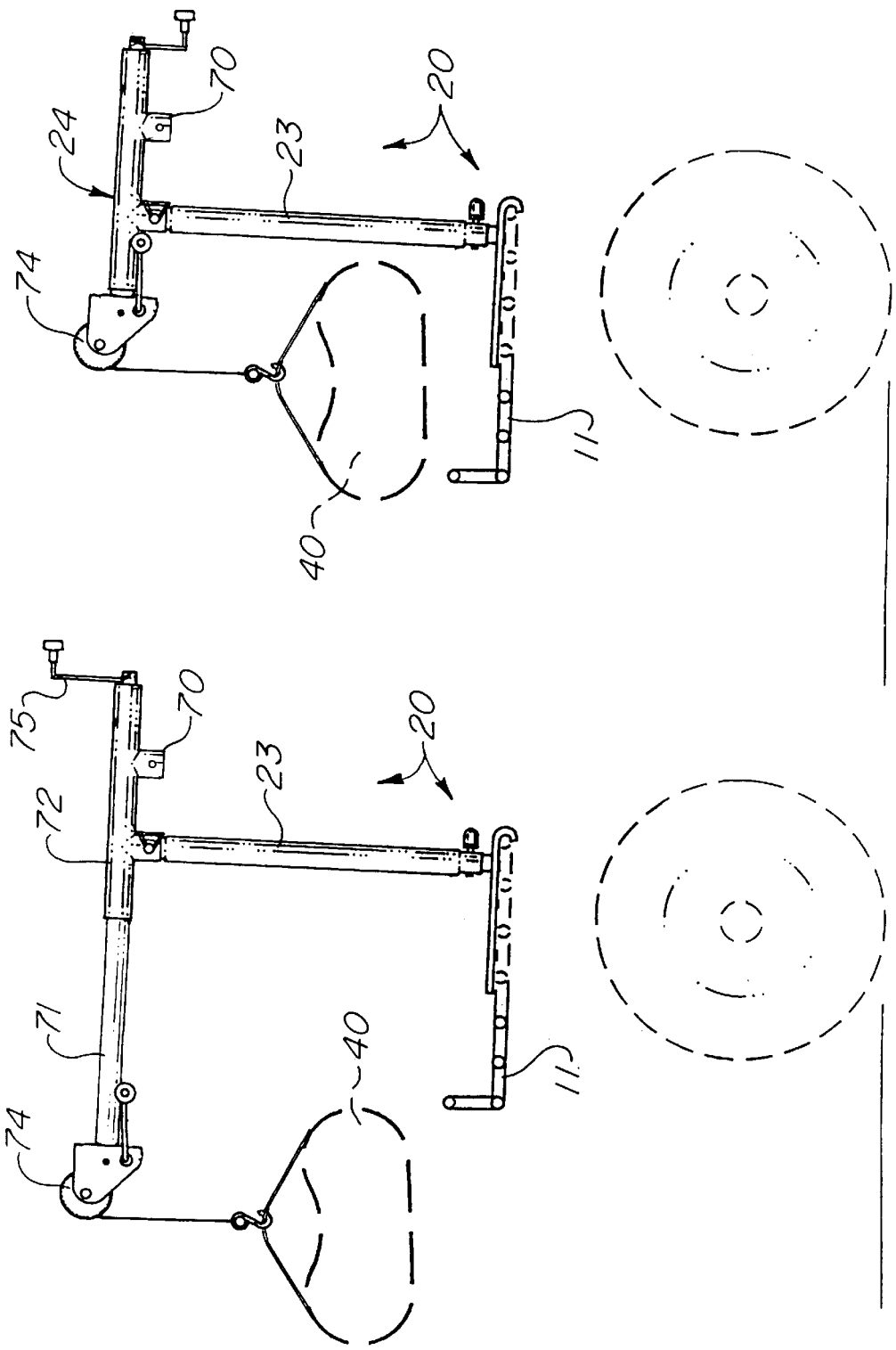

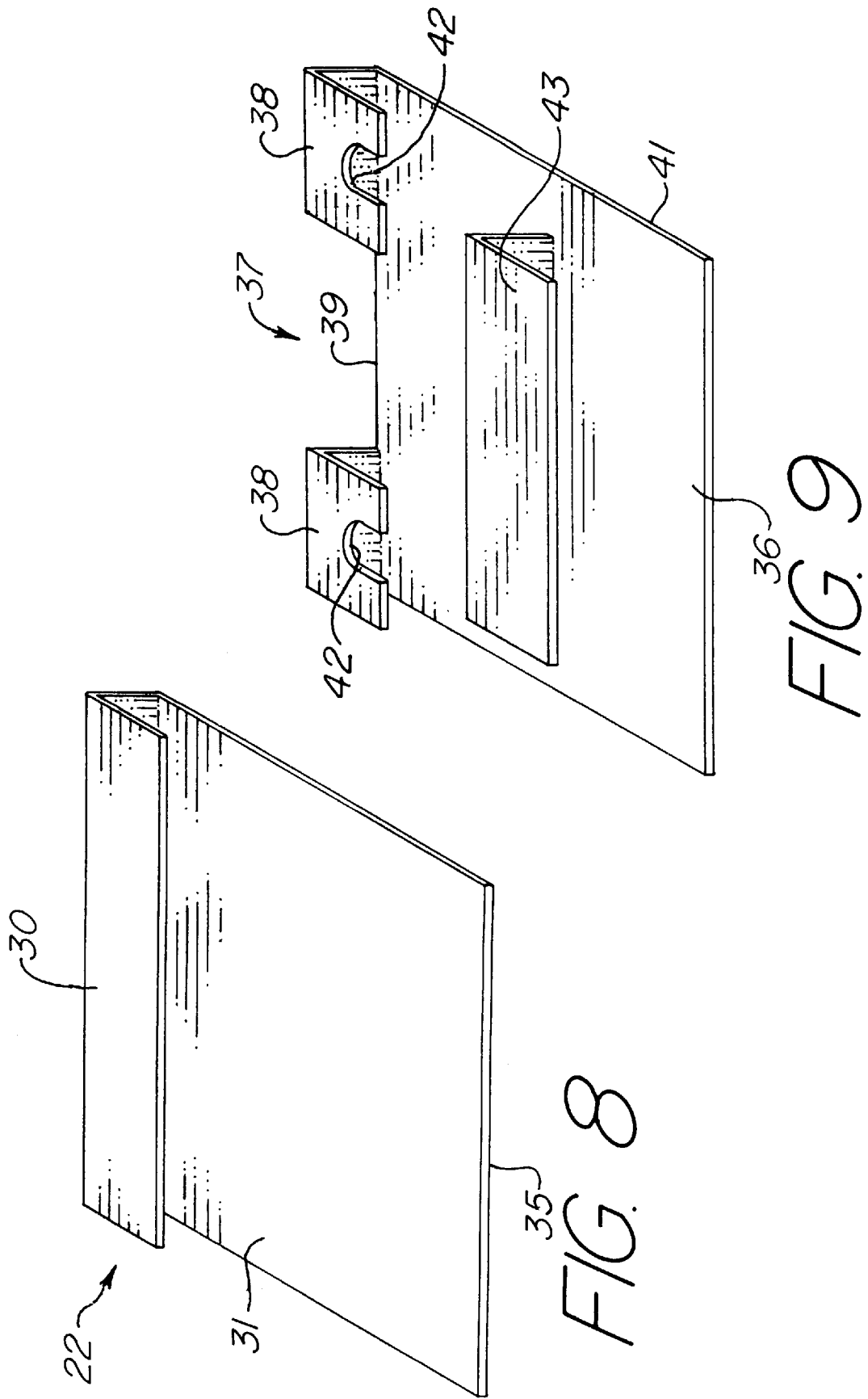

ATV-MOUNTED GAME HOIST

BACKGROUND OF THE INVENTION

The present invention relates to a hoist for lifting game animals, and in particular, to such a hoist which is mountable to an all-terrain vehicle (ATV) and may be mounted and demounted without the use of permanent fasteners.

Game animals carcasses, particularly those of large animals such as deer, are quite heavy and can present a challenge to the hunter wishing to load a carcass into an ATV. Mechanical hoists are known to be used for this purpose.

Muzzi et al. (U.S. Pat. No. 5,662,451) discloses such a hoist for lifting game animals. The Muzzi et al. device is specifically adapted for mounting to the cargo rack of an ATV. The hoist comprises a horizontal boom attached to a vertical support shaft. The hoist is attached to a base. The Muzzi et al. device mounts to the cargo rack with a base using permanent fasteners. The base is provided with slots through which U-bolts are attached. While Muzzi discloses a telescoping vertical shaft and a hand operated winch, it does not disclose a rotating telescoping boom that may be extended manually. Neither does Muzzi disclose any arrangement by which the hoist is easily assembled and disassembled without using bolts or other permanent fasteners.

Hawkins (U.S. Pat. No. 4,069,922) discloses a hoist mounted on a pick-up truck. The hoist includes a telescoping rotatable boom and an outboard support leg. Hawkins does not disclose a means for mounting the device to an ATV cargo rack.

Koscinsky, Jr. (U.S. Pat. No. 5,445,487) likewise discloses an elongated lower mast member, a rotatable cantilevered telescoping boom and a plurality of different mounting members for mounting the assembly to different support structures. Although several different mounting schemes are disclosed, none are specifically adapted to mounting the device to an ATV cargo rack.

Various other patents disclose different types of lifts or hoists mounted to vehicles. York (U.S. Pat. No. 4,806,063) discloses a hoist specifically adapted to lifting game animals. The York device is mounted to a standard trailer hitch. Webb, Jr. (U.S. Pat. No. 4,640,658) also discloses a device for mounting a carrier to the tongue of a trailer hitch.

The problems not solved by the prior art include the desirability of mounting a game hoist to an ATV cargo rack without using bolts or similar permanent fasteners, the need for a boom to be able to extend to lift a game animal carcass over a cargo rack, and the desirability of being able to assemble and disassemble a hoist in the field manually without the use of mechanical fasteners. It is also desirable that a disassembled hoist be compact and easily stowed on an ATV.

The limitations of the prior art are overcome by the present invention as described below.

SUMMARY OF THE INVENTION

The present invention is a device to be mounted to an all-terrain vehicle (ATV). The typical ATV is provided with a cargo rack which typically comprises a plurality of transverse bars or tubes. The game hoist is intended to be mounted to the cargo rack of an ATV in a manner that does not require bolts or similar permanent or semi-permanent fasteners.

The game hoist is mounted to the cargo rack of the ATV using a base plate which has one or more sets of L-shaped angle brackets mounted to the underside of the base plate. The sets of angle brackets form pockets or receptacles on the underside of the base plate to receive respective transverse bars of the cargo rack. The base plates slide onto the transverse bars and do not require any fasteners. They are held in position by gravity and the weight of the hoist and cargo on the base plate. Rotational forces on the base plate are contained by the action of the L-shaped brackets against the cargo rack bars. The base plate has various embodiments so that the plate can be fitted onto various types of cargo racks. One embodiment has a single bracket along one edge of the base plate. Another embodiment has three brackets-two along the edge each with an indentation to go around a vertical rod, and one toward the center of the plate. Other embodiments are contemplated within the scope of the present invention.

The base plate is one of three major components of the game hoist which may be easily assembled and disassembled. In addition to the L-shaped angle brackets, the base plate has an upward facing cylindrical post which receives a cylindrical column, the second major component of the game hoist.

The third major component of the game hoist is a telescoping boom. The telescoping boom is provided with a cylindrical collar which fits over the top end of the column. The boom may rotate about the column or it may be pinned in a fixed position. In a second embodiment the telescoping boom is provided with two collars. One collar is located near the middle of the boom and the other collar is located near the end away from the winch. This allows some flexibility in the placement of the boom on the column so that a greater reach is possible if it is needed to clear a larger cargo rack.

The telescoping boom has an inner cylindrical member which is slidingly received in an outer cylindrical member. The inner cylindrical member may be telescoped outward from the outer cylindrical member using various forms of screws or gears which are commonly employed for such purposes.

The outer end of the inner cylindrical member is provided with a manually operated winch. The winch is desirably provided with a ratchet mechanism.

The game hoist may be easily assembled or disassembled without using tools. The game hoist is intended to be used by hunters to assist in the difficult task of hoisting a heavy game animal carcass onto the cargo rack of an ATV. The base plate is first assembled to the cargo rack as described above. The column is placed on the base plate and the telescoping boom onto the upper end of the column. A line from the winch is secured to the game animal carcass. For optimum balance, the telescoping boom may be adjusted outward as necessary to clear the end of the ATV cargo rack. The telescoping boom may also be rotated on the column as necessary. The winch may then be operated to lift the game animal carcass into position where it may be lowered onto the cargo rack.

It is therefore an object of the present invention to provide for mounting a game hoist to an ATV cargo rack without using bolts or similar permanent fasteners.

It is a further object of the present invention to provide for a boom to be able to extend to lift a game animal carcass over a cargo rack.

It is also an object of the present invention to provide for the assembly and disassembly of a hoist in the field manually without the use of mechanical fasteners.

It is a still further object of the present invention to provide for a disassembled hoist that is compact and easily stowed on an ATV.

These and other objects and advantages of the present invention will be apparent from a consideration of the following detailed description of the preferred embodiments in conjunction with the appended drawings as described following.

BRIEF DESCRIPTION OF THE DRAWINGS

FIG. 1 is a semi-perspective view of the right side of an all-terrain vehicle (ATV) with the cargo hoist of the present invention mounted to a rear cargo rack. The boom is shown in an alternative embodiment in which the boom is provided with two collars to allow the boom to be mounted to the vertical column in two positions-one position allowing the boom to be placed on the column more centrally for greater balance and an alternative position in which the boom may be placed in an offset position so as to allow for greater extension of the boom with respect to the cargo rack.

FIG. 2 is a right side elevational view of the cargo hoist of the present invention with a partial shadow outline of an ATV and cargo to be loaded onto the cargo rack of the ATV.

FIG. 3 is the right side elevational view of FIG. 2 showing the boom of the hoist extended and the line from the winch attached to the cargo.

FIG. 4 is the right side elevational view of FIG. 2 with the cargo lifted from the ground by the winch.

FIG. 5 is the right side elevational view of FIG. 2 with the boom retracted so as to place the cargo over the cargo rack.

FIG. 8 is a persepective view of the underside of one embodiment of the base plate of the present invention showing a single L-shaped bracket for receiving a transverse rod of an ATV cargo rack.

FIG. 9 is a perspective view of the underside of an alternative embodiment of the base plate of the present invention showing a pair of L-shaped brackets located along one edge of the base plate and having cutouts for accomodating vertical bars of a cargo rack. Also, another L-shaped bracked located near the center of the base plate is shown.

DETAILED DESCRIPTION OF THE PREFERRED EMBODIMENTS

Figure 7:
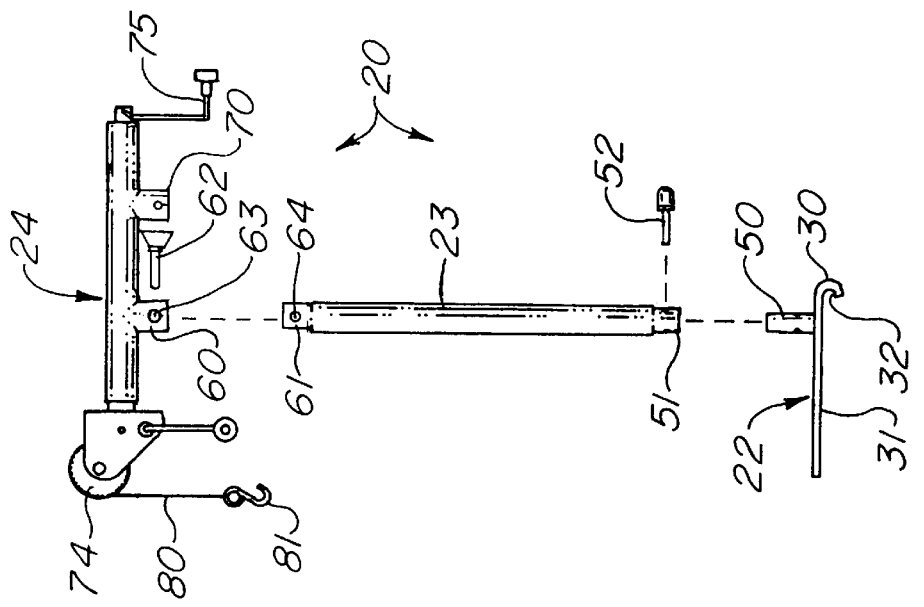
FIG. 7 is an exploded right side elevational view of the cargo hoist of the present invention.
Figure 6:
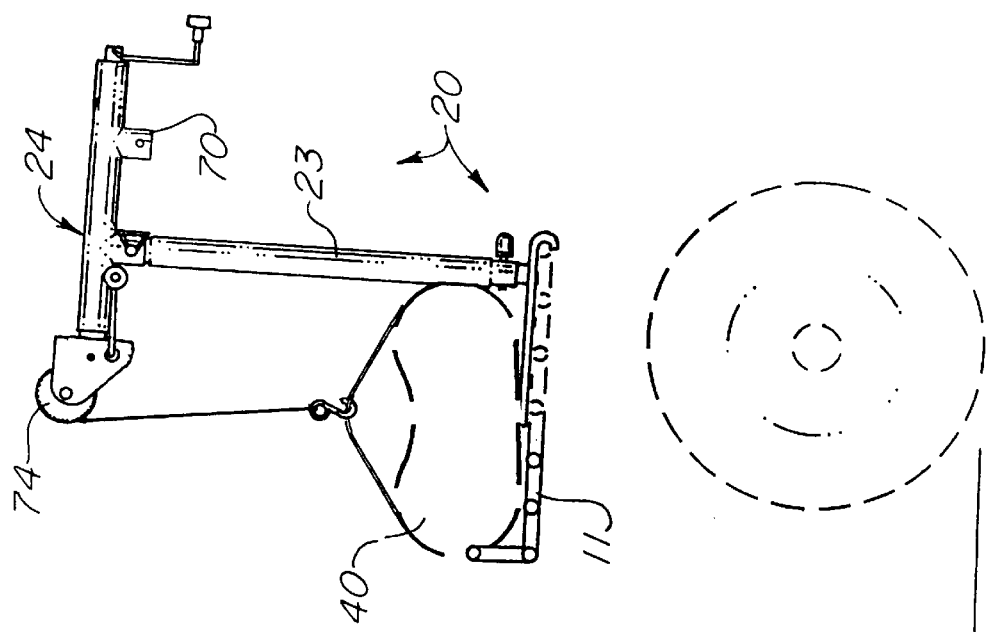
FIG. 6 is the right side elevational view of FIG. 2 with the cargo lowered by the winch to the cargo rack.

With reference to FIGS. 1 and 7, the preferred embodiment of the present invention may be described as follows:

The present invention is a device to be mounted to an all-terrain vehicle (ATV). The typical ATV is provided with a cargo rack which typically comprises a plurality of transverse bars. The game hoist of the present invention may be mounted to the cargo rack of an ATV in a manner that does not require bolts or similar permanent or semi-permanent fasteners.

FIG. 1 is a semi-perspective view of the right side of an all-terrain vehicle (ATV) 10 with the game hoist 20 of the present invention mounted to a rear cargo rack 11

FIG. 7 is an exploded right side elevational view of the game hoist 20 of the present invention showing the three major components—a base plate 22, a column 23, and a telescoping boom 24.

The game hoist 20 is mounted to the cargo rack 11 of the ATV 10 using a base plate 22 which has one or more sets of angle brackets 30 mounted to the underside 31 of the base plate 22. The sets of angle brackets 30 form pockets 32 on the underside 31 of the base plate 22 to receive respective transverse bars 33 of the cargo rack 11 as shown in FIG. 2. The angle brackets 30 of the base plate 22 slide onto respective transverse bars 33 and do not require any fasteners. They are held in position by gravity and the weight of the hoist 20 and cargo 40 on the base plate 22. Rotational forces on the base plate 22 are contained by the action of the angle brackets 30 against the transverse bars 33 of the cargo rack 11 and by the bearing of the underside 31 of the base plate 22 against one or more of the transverse bars 34 not received into the angle brackets 30. It is a desirable feature of the present invention that the base plate may be located on the cargo rack such that the main weight of the hoist and the cargo bears against the ATV at a point interior to the axle of the ATV so that the load is less likely to cause the ATV to tip over. This avoids the need for an outrigger or other support mechanism to be added to the ATV at additional cost and with additional complexity.

The base plate 22 has various embodiments so that the base plate 22 can be fitted onto various types of cargo racks. It is to be understood that there are numerous variations in the configuration of ATV cargo racks but that any configuration of transverse bars may be accomodated within the present invention by changing the shape, number or location of the angle brackets. FIG. 8 is a perspective view of the underside 31 of the embodiment of the base plate 22 of FIGS. 1–7 showing a single bracket located along one edge of a flat plate 35 for receiving a transverse rod of an ATV cargo rack.

FIG. 9 is a perspective view of the underside 36 of an alternative embodiment 37 of the base plate of the present invention showing a pair of brackets 38 located along an edge 39 of a flat plate 41 and having cutouts 42 for accomodating vertical bars of a cargo rack. Also, a central bracket 43 is located near the center of the flat plate 41. Other embodiments are contemplated within the scope of the present invention.

The base plate 22 is one of three major components of the game hoist 20 which may be easily assembled and disassembled. In addition to the angle brackets 30, the base plate 22 has an upright post 50 as shown in FIG. 7. A column 23 is provided with a recess (not shown) on a lower end 51 for receiving the upright post 50 of the base plate 22. In certain embodiments it is desirable that the post 50 and the recess of the column 23 be cylindrical so that the column 23 may be freely rotatable on the post 50. The column 23 may also be fixed to the post 50 with a removable pin 52 passing through an opening (not shown) in the end 51 of the column 23 into a matching opening (not shown) in the post 50.

The third major component of the game hoist 20 is a telescoping boom 24. The telescoping boom 24 is provided with a cylindrical collar 60 which fits over the upper end 61 of the column 23. The telescoping boom 24 may rotate about the column 23 or it may be pinned in a fixed position by passing removable pin 62 through an opening 63 in the collar 60 into a matching opening 64 in the upper end 61 of the column 23. In a second embodiment the telescoping boom 24 is provided with two collars as shown in FIG. 1. In addition to the collar 60 located near the middle of the boom 24, a second collar 70 is located in an offset position. This allows some flexibility in the placement of the boom 24 on the column 23 so that a greater reach is possible if needed to clear a larger cargo rack. The central position allows for greater balance and the alternative position in which the boom may be placed in an offset position allows for greater extension of the boom with respect to the cargo rack.

As may be seen from FIGS. 2–6, the telescoping boom 24 comprises an inner member 71 which is slidingly received in an outer member 72. The collars 60, 70 are affixed to the outer member 72. The inner member 71 may be telescoped outward from the outer member 72 using various forms of screws or gears which are known in the art and which are commonly employed for such purposes. In a manually operated embodiment a handle 75 may be provided to extend the boom 24.

The outer end 73 of the inner member 71 is provided with a manually operated winch 74. The winch 74 is desirably provided with a ratchet mechanism. It is to be understood that various types of winch mechanisms are contemplated to be within the scope of the present invention and could include electrically operated winches or other forms of winches other than manually operated winches.

The boom 24 is desirably provided with a manually operated screw extension device; however, the boom 24 may employ an electrically powered extension device. It is understood that various types of boom extension systems are contemplated to be within the scope of the present invention. The present invention would include an electrically operated boom or other forms of boom which are not manually operated. The other booms would include but not necessarily be limited to electrically powered boom extension devices.

The game hoist 20 may be easily assembled or disassembled without using tools The base plate 22 is first assembled to the cargo rack 11 by sliding the base plate 22 along the top of the cargo rack 11 until the brackets 30 engage with respective transverse bars 33 as described above. The column 23 is placed on the base plate 22 and the telescoping boom 24 is placed onto the upper end 61 of the column 23. The boom 24 may be locked to the column 23 by pin 62 and the column 23 may be locked to the base plate 22 by pin 52. The dissasembly of the present invention is accomplished by reversing the actions described above. When disassembled the game hoist 20 may be easily stowed in a compact configuration on the ATV strapped to the front cargo rack which is normally available on an ATV and which would not interfere with the use of the cargo rack 11 for carrying a game animal carcass.

The game hoist 20 is intended to be used by hunters to assist in the difficult task of hoisting a heavy game animal carcass onto the cargo rack 11 of an ATV 10. The operation of the game hoist 20 may be described with reference to FIGS. 2–6. A line 80 from the winch 74 is secured to cargo 40, which may be a game animal carcass. For optimum balance, the telescoping boom 24 may be adjusted outward as necessary to clear the end of the ATV cargo rack 11 as shown in FIG. 3. The telescoping boom 24 may also be rotated on the column 23 as necessary. A hook 81 on the line 80 may be attached to the cargo 40 and the winch 74 may then be operated to lift the cargo into position where it may be lowered onto the cargo rack 11.

The present invention has been described with reference to certain preferred and alternative embodiments that are intended to be exemplary only and not limiting to the full scope of the present invention as set forth in the appended claims.

What is claimed is:

1. A game hoist for mounting to the cargo rack of an all terrain vehicle (ATV), the cargo rack being of the type having a plurality of transverse bars, comprising:

a base plate for mounting the game hoist to the cargo rack, said base plate comprising a flat plate having an underside for bearing on one or more of the transverse bars of the cargo rack, said flat plate having one or more angle brackets affixed to said underside of said flat plate, forming with said plate a rearwardly open channel for mounting said plate to the cargo rack by placing the channel adjacent to one of said transverse bars and sliding the plate rearwardly, and an upright post affixed to the upperside of said flat plate;

a column having a lower end and an upper end, said lower end having a recess for receiving said upright post of said base plate; and a telescoping boom comprising an outer member and an inner member slidingly received in said outer member, said outer member having at least one collar for receiving said upper end of said column, said inner member further comprising an outer end, winch means affixed to said outer end, and telescoping means for extending and retracting said inner member with respect to said outer member.

2. The game hoist of claim 1 wherein said collar is affixed to said telescoping boom at a central position.

3. The game hoist of claim 2 wherein said telescoping boom further comprises a second collar affixed to said telescoping boom at a position proximal to an end of said telescoping boom opposite to said winch.

4. The game hoist of claim 1 wherein said upper end of said column is cylindrical and said collar is cylindrical whereby said telescoping boom is rotatable upon said column.

5. The game hoist of claim 1 wherein said post is cylindrical and said recess of said lower end of said column is cylindrical whereby said column is rotatable upon said post.

6. The game hoist of claim 1 wherein said collar further comprises an opening and said upper end of said column further comprises an opening for receiving a pin through said opening of said collar for locking said collar to said upper end of said column.

7. The game hoist of claim 1 wherein said lower end of said column further comprises an opening and said post further comprises an opening for receiving a pin through said opening of said lower end of said column for locking said column to said post.

8. The game hoist of claim 1 wherein said angle bracket is affixed to said base plate along an edge of said base plate.

9. The game hoist of claim 1 wherein the cargo rack has a plurality of vertical bars and wherein said base plate comprises a pair of angle brackets affixed along an edge of said flat plate and wherein each of said pair of angle brackets further comprises a cutout for receiving a respective vertical bar of the cargo rack.

* * * * *